United States Patent [19]

Grawey et al.

[11] 4,152,388

[45] May 1, 1979

[54] TIRE TREAD FORMING METHOD

[75] Inventors: Charles E. Grawey; John J. Groezinger, both of Peoria, Ill.; Quentin T. Woods, San Jose, Calif.

[73] Assignee: Caterpillar Tractor Co., Peoria, Ill.

[21] Appl. No.: 791,660

[22] Filed: Apr. 28, 1977

Related U.S. Application Data

[63] Continuation-in-part of Ser. No. 706,712, Jul. 19, 1976, abandoned.

[51] Int. Cl.² .............................................. B29H 5/02
[52] U.S. Cl. ..................................... 264/248; 156/125; 156/129; 156/394; 264/161; 264/255; 264/326; 425/46; 425/47
[58] Field of Search ................... 264/94, 315, 326, 248, 264/335, 161, 255, 250; 425/46, 47; 156/394, 125, 129

[56] References Cited

U.S. PATENT DOCUMENTS

| | | | |
|---|---|---|---|
| 1,380,085 | 5/1921 | Walton | 425/46 |
| 1,416,362 | 5/1922 | Lambert | 425/46 |
| 2,672,914 | 3/1954 | Weigold et al. | 156/125 |
| 2,686,554 | 8/1954 | Hinman | 264/326 X |
| 3,553,309 | 1/1971 | Pacciarini et al. | 264/326 X |
| 3,825,457 | 7/1974 | Holroyd et al. | 264/248 X |
| 3,974,018 | 8/1976 | Arimura et al. | 264/315 X |
| 3,989,791 | 11/1976 | Tippin | 264/315 |

*Primary Examiner*—Jan H. Silbaugh
*Attorney, Agent, or Firm*—John W. Grant

[57] ABSTRACT

A body having rubber material thereon is positioned on a lower member, and an upper member is moved toward the lower member, such relative movement causing tread-forming shoes to move to inward positions to form a tread on the rubber material. As an alternative, the upper and lower members may be brought together, and rubber material may be injected into position to have a tread formed thereon. Upon movement of the upper and lower member relatively apart, the rubber material is made to remain in contact with the shoes, and the body is removed, whereupon an annular core having rubber material thereon is disposed on the lower member, and the upper and lower members are again brought together to deposit the rubber material in contact with the shoes onto the rubber material on the core.

14 Claims, 20 Drawing Figures

FIG _ 1

FIG_2

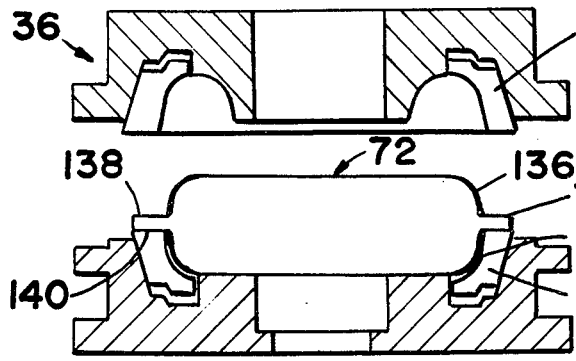
FIG _ 10
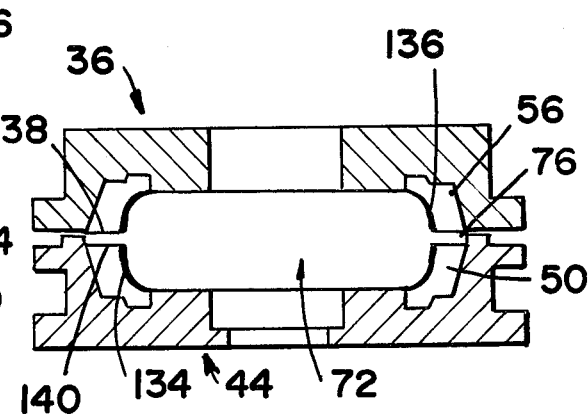
FIG _ 11
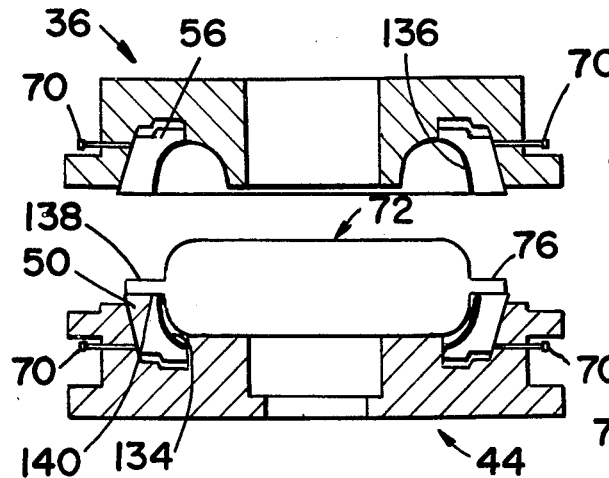
FIG _ 12
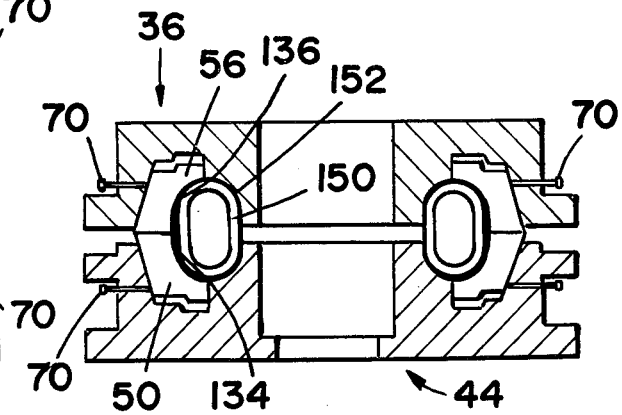
FIG _ 13
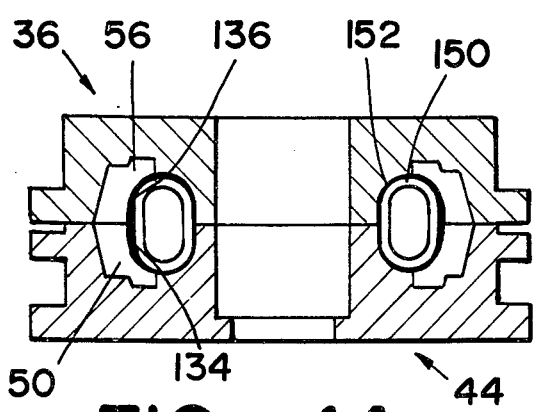
FIG _ 14
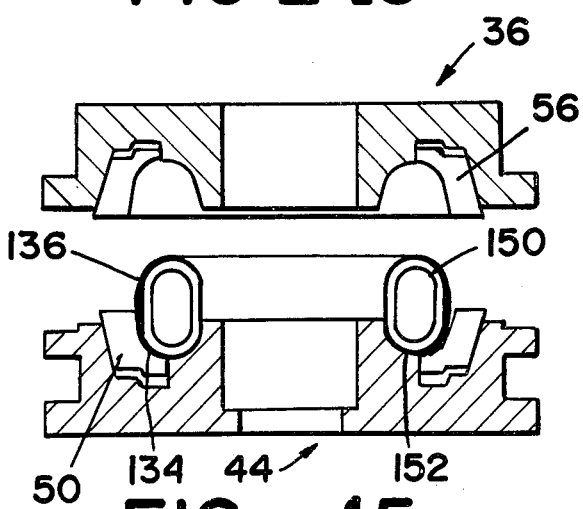
FIG _ 15

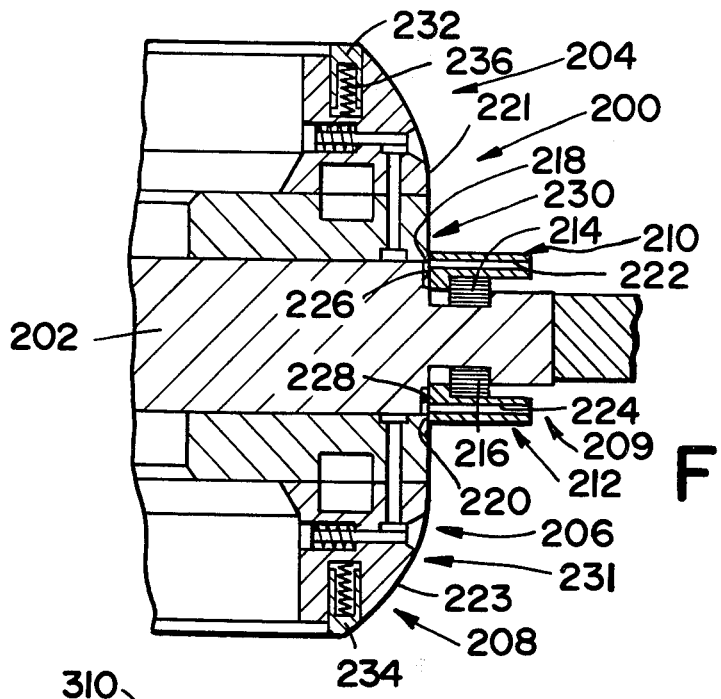
FIG_16
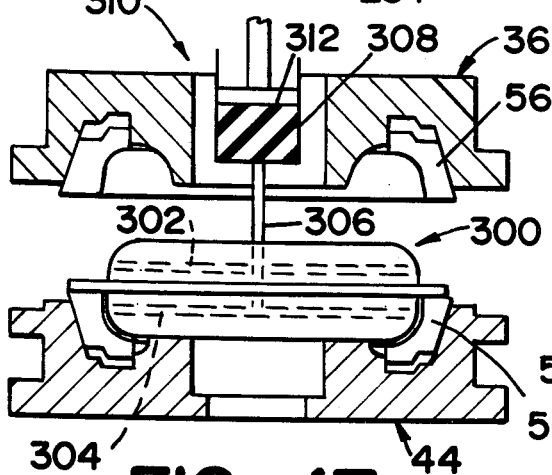
FIG_17
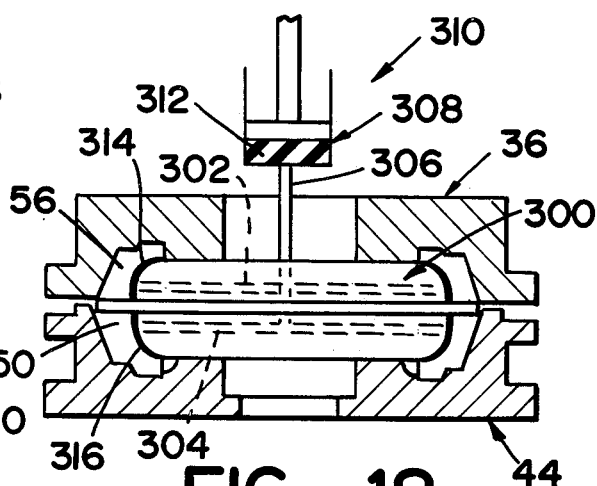
FIG_18
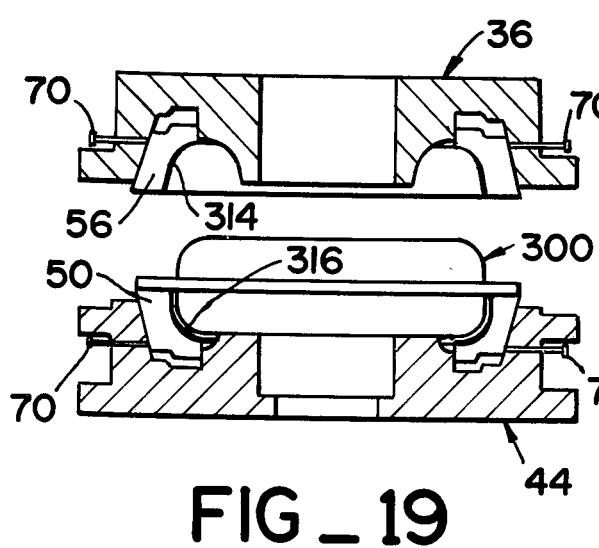
FIG_19
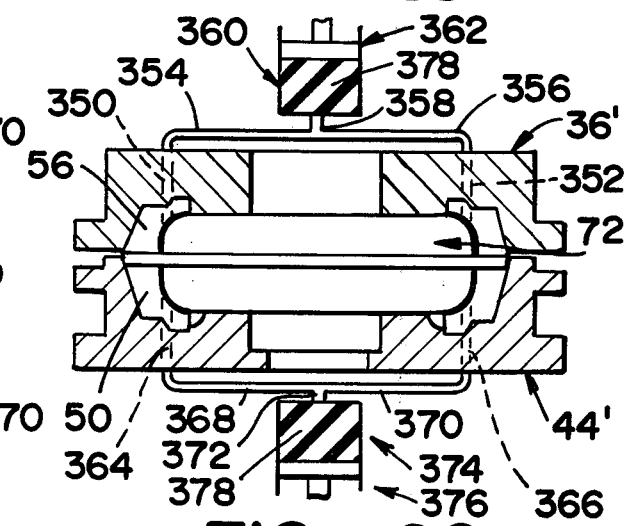
FIG_20

TIRE TREAD FORMING METHOD

CROSS-REFERENCE TO RELATED APPLICATIONS

This application is a continuation-in-part of application Ser. No. 706,712, filed July 19, 1976, now abandoned and entitled "TIRE TREAD FORMING METHOD AND APPARATUS".

BACKGROUND OF THE INVENTION

This invention relates to method and apparatus for forming a tread on a tire, and more particularly, to a method and apparatus wherein tread-forming shoes form a tread on rubber material.

In the formation of a tread on a tire, upper and lower mold portions are provided, each mold portion containing means defining a tread pattern. In one known embodiment, each mold portion contains a rigidly mounted solid ring, which defines the tread pattern, and in another known apparatus, each mold portion contains a resiliently mounted segmented ring (i.e., individual tread shoes). In both systems, it is common practice to initially completely close the two mold portions together, and then to apply fluid pressure to the tire to force the rubber into contact with the tread-forming shoes. The segmented ring design as described above is considered to have a certain advantage over the rigidly mounted solid ring system, since when the mold portions are moved apart to allow removal of the tire, the resiliently mounted shoes move radially outwardly some distance greater than the tread groove depth so that the tire can be removed from the apparatus without distorting the tread.

Since in such conventional systems the tire is inflated and expanded to force the rubber into the tread-forming means, the expansion and forces involved in forming the tread tend to displace radial and circumferential reinforcements from their ideal positions.

It will be understood that it would be considered advantageous for the tread to be formed on the tire with the tire structure remaining in its ideal position during the formation thereof through isolation of the forces of the reinforcement of the tire.

It will also be understood that, while achieving proper formation of the tread, the method thereof, and the apparatus for achieving such method, should, with advantage, be extremely simple and efficient.

SUMMARY OF THE INVENTION

It is accordingly an object of this invention to provide an apparatus for forming tread or rubber material through the use of tread-forming shoe means.

It is a further object of this invention to provide apparatus which, while fulfilling the above object, provides for convenient and simple handling thereof in the formation of such tread.

It is a further object of this invention to provide apparatus and method of forming tread on rubber material of a tire which avoids inflation and expansion of the tire during forming of tread, so as to avoid displacement of radial and circumferential reinforcements from their ideal positions.

It is a still further object of this invention to provide apparatus which, while fulfilling the above objects, is simple in design and effective in use.

It is a still further object of this invention to provide a method for forming a tread on rubber material which is extremely effective and simple in practice.

Broadly stated, the invention for forming a tread on elastomeric material comprises a body, elastomeric material being applicable thereon adjacent one and the other sides thereof. Further included is a first member and first tread-forming shoe means, movably mounted relative to the first member so as to be movable to an outward extended position, and an inward retracted position relative thereto. Resilient spring means operatively connect the first member and first tread-forming shoe means for resiliently biasing the first tread-forming shoe means in its outward, extended position. Further included is a second member, and second tread-forming shoe means movably mounted relative to the second member, so as to be movable to an outward extended position, and an inward retracted position relative thereto. Resilient spring means operatively connect the second member and second tread-forming shoe means for resiliently biasing the second tread-forming shoe means in its outward, extended position. The first and second members are positionable so that movement of the first and second members relatively together moves the first and second tread-forming shoe means toward the inward retracted positions thereof, the first and second tread-forming shoe means thereby being positioned to form tread in elastomeric material applied to the body adjacent one and the other sides thereof. Further included are means for moving the first and second members relatively together.

Broadly stated, the method of forming a tread on elastomeric material comprises depositing elastomeric material on a body adjacent one and the other sides of the body, and positioning the body on first tread-forming shoe means movably mounted to a first member so as to be movable to an outward extended position and an inward retracted position relative to the first member, the first tread-forming shoe means being resiliently biased into the outward extended position thereof. The method further comprises moving a second member to bring second tread-forming shoe means adjacent the body, the second tread-forming shoe means being movably mounted to the second member so as to be movable to an outward extended position and an inward retracted position relative thereto, the second tread-forming shoe means being resiliently biased into the outward extending position thereof. The method further comprises moving the first and second members relatively further together, to move the first and second tread-forming shoe means toward the body, bringing the first and second tread-forming shoe means into contact with elastomeric material positioned on the body adjacent one and the other sides of the body.

BRIEF DESCRIPTION OF THE DRAWINGS

These and other objects of the invention will become apparent from a study of the following specification and drawings in which:

FIGS. 10-15 are schematit views of the apparatus showing the operation thereof;

FIG. 16 is a view similar to that shown in FIG. 9, but of an alternate embodiment of body;

FIGS. 17-19 are schematic views of an alternate embodiment of apparatus showing the operation thereof; and FIG. 20 is a schematic view of yet another embodiment of the apparatus showing the operation thereof.

DESCRIPTION OF THE PREFERRED EMBODIMENT

Figure 1:
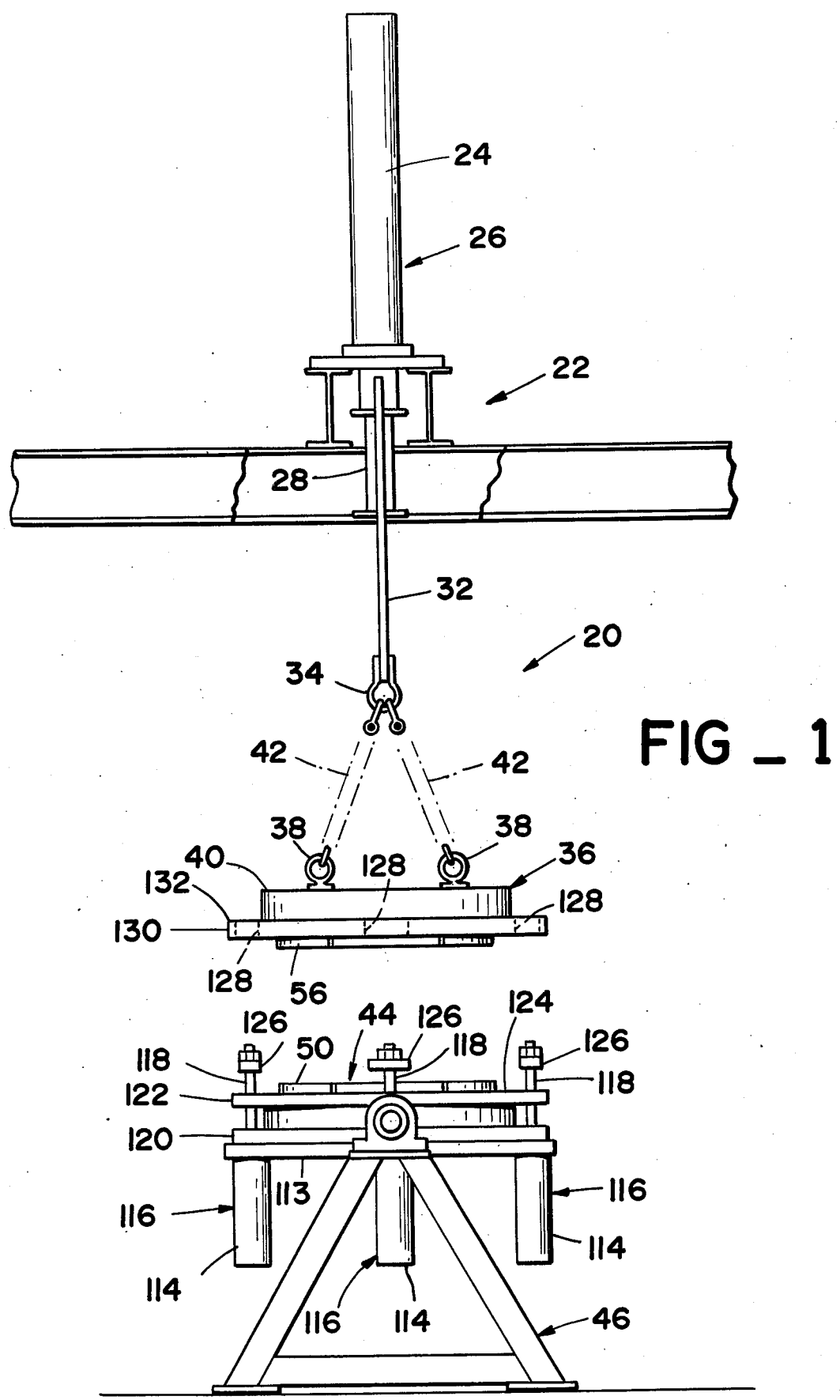
FIG. 1 is a front elevation of an overall apparatus incorporating the invention.
Figure 2:
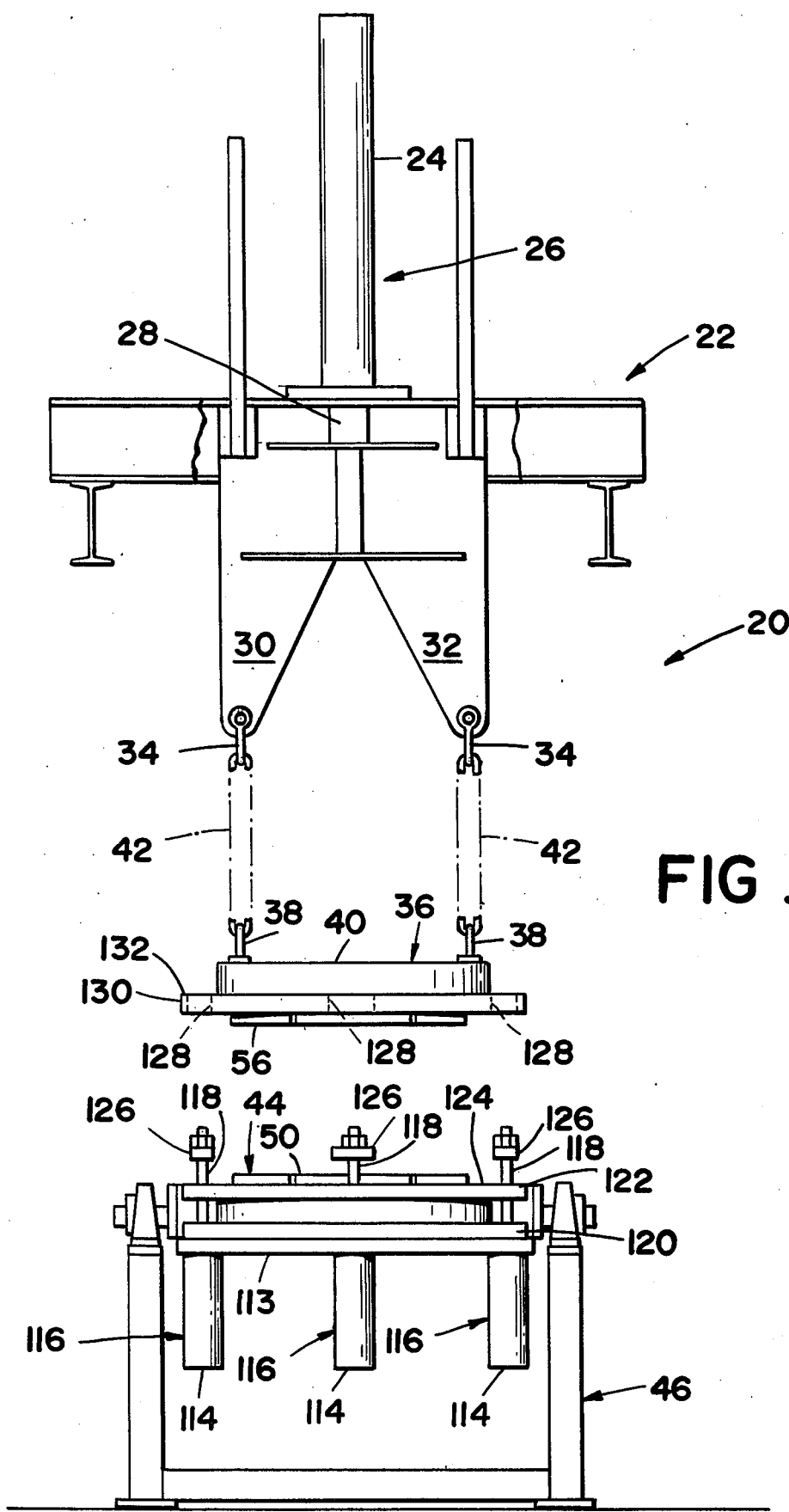
FIG. 2 is a side elevation of the apparatus shown in FIG. 1.

Shown in FIGS. 1 and 2 is the overall apparatus 20 incorporating the invention. As shown therein, a beam structure 22 has fixed thereto the body 24 of a cylinder 26, with the rod end 28 thereof extending downwardly therefrom. The rod end 28 has fixed thereto a plate members 30, 32 having respective eyes 34 mounted thereto. A first or upper member 36 has eyes 38 mounted to the upper surface 40 thereof, and chains 42 interconnect the eyes 34 and eyes 38 as shown in such FIGS. 1 and 2. It is to be understood that through extension and retraction of the rod 28 of the cylinder 26, the plate members 30, 32 are lowered and raised to turn lower and raise the upper member 36.

A lower member 44 is mounted to a frame 46 which in turn rests on the floor. Details of the upper and lower members 36, 44 are best shown in FIG. 3.

Figure 3:
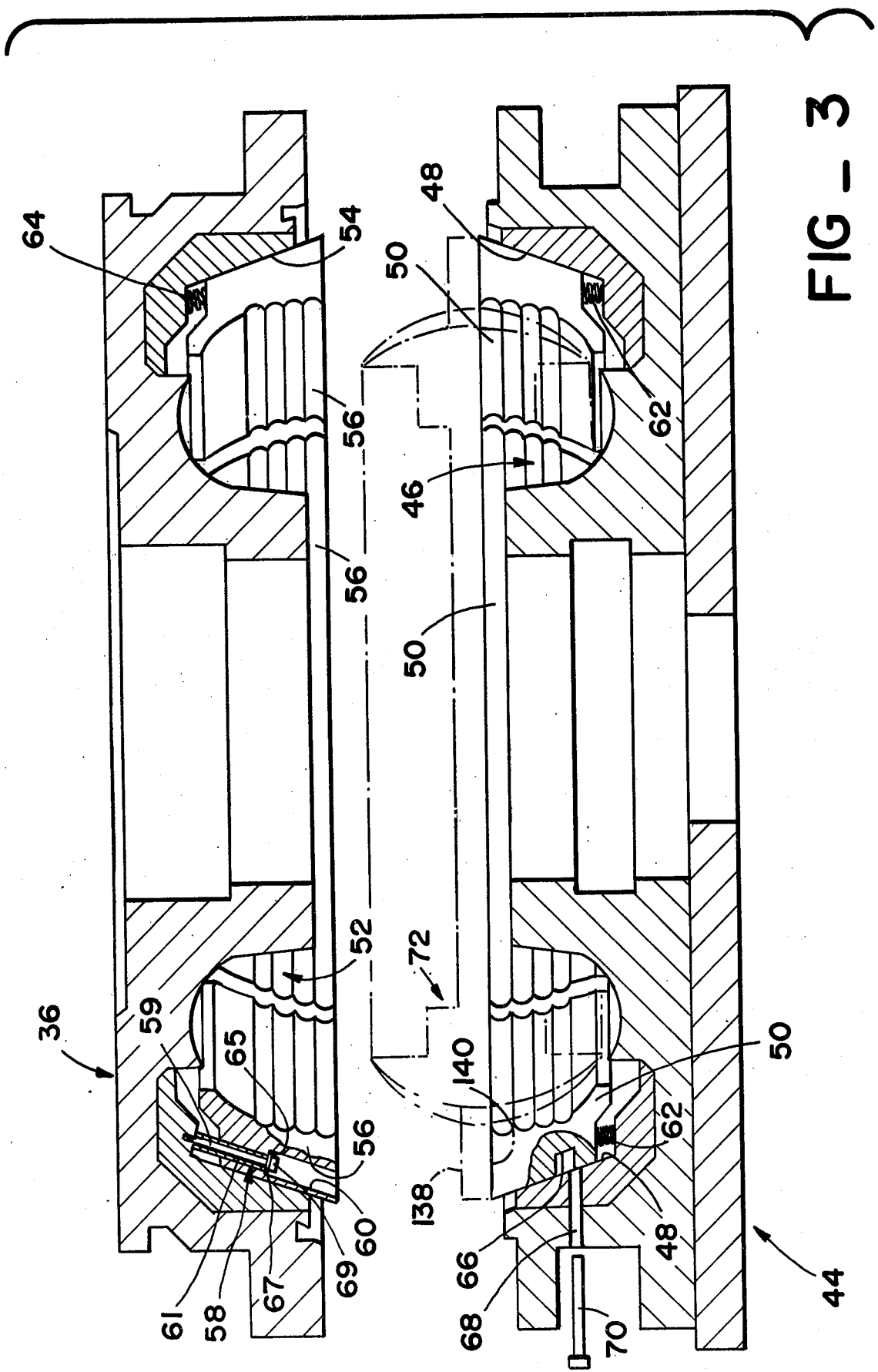
FIG. 3 is a section view of the main portion of the apparatus of FIGS. 1 and 2.
Figure 4:
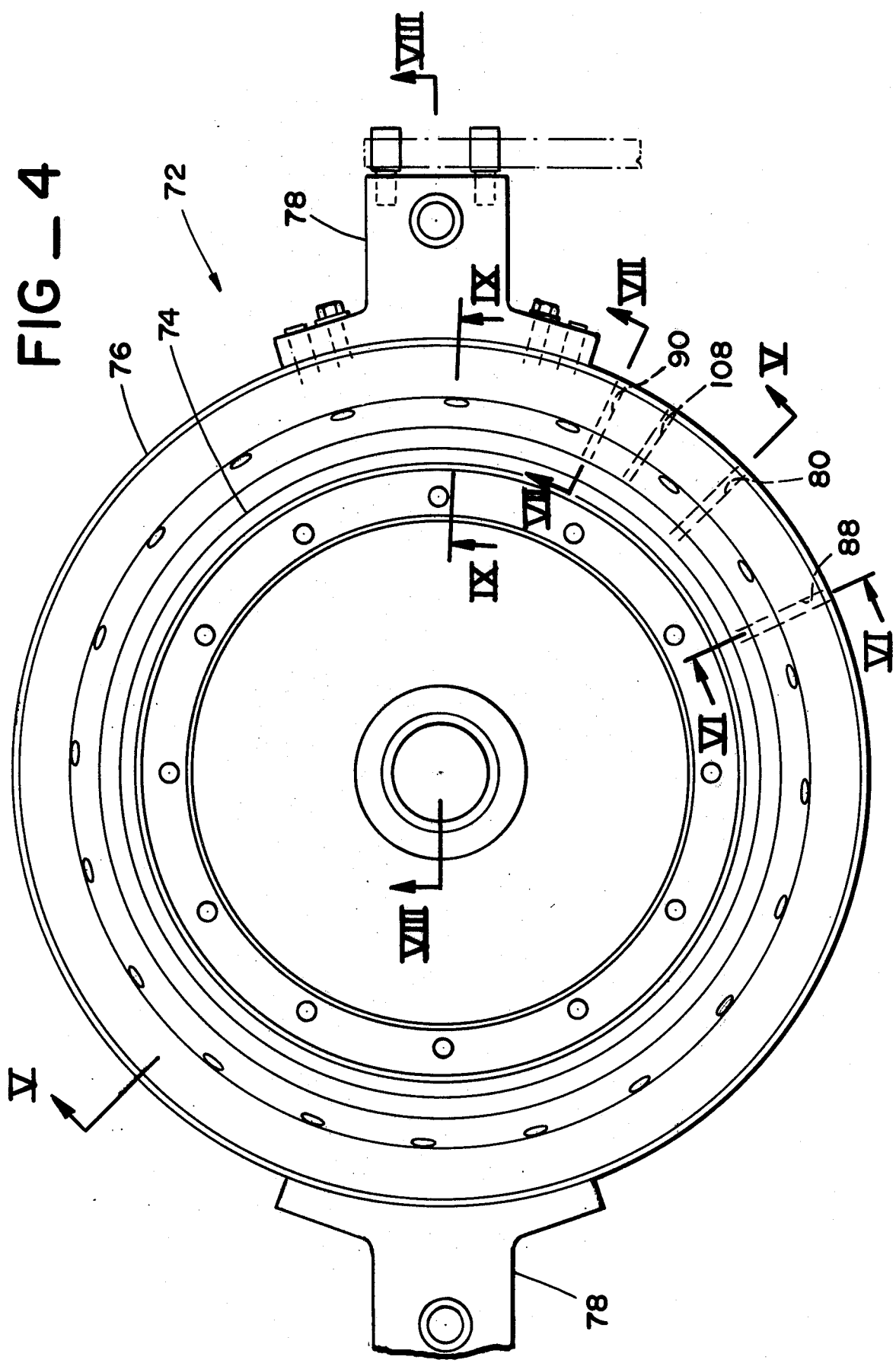
FIG. 4 is a plan view of the body for use with the apparatus of FIG. 3.

As shown in such FIG. 3, the lower member 44 defines an annular recess 46, the outer surface 48 of which is angled downwardly and inwardly of the member to define a ramp surface. In contact with such ramp surface 48 are six tread-forming shoes 50, spaced about the annular recess 46. The upper member 36 also defines an annular recess 52, with the outer ramp surface 54 thereof tapered upwardly and inwardly of the member 36 as shown in FIG. 3, and further included are six tread-forming shoes 56 positioned in contact with the ramp surface 54, and spaced about the annular recess 52 of the member 36. The tread-forming shoes 56 are retained for sliding movement along the ramp surface 54 by means of angles bolt structures 58. Each both structure 58 includes a bolt 59 disposed through a stepped bore 60 defined by a shoe 56, and having the end thereof in threaded engagement with the member 36. A sleeve 61 is disposed about the bolt 59, in contact with the member 36 and extending to the step 65 in the bore 60. A washer 67 rests on the step 65 and the sleeve 61, forced thereon by the head 69 of the bolt 59. The tread-forming shoes 50 are also mounted to the member 44 in the same manner. It will be seen that through such mounting of the tread-forming shoes 56 to the member 36, the tread-forming shoes 56 are movable to outward, extended positions relative to the member 36, and inward, retracted positions relative to the member 36. Similarly the tread-forming shoes 50 are movable to outward, extended positions relative to the member 44, and inward, retracted positions relative to the member 44.

Resilient springs 62 interconnect the member 44 and tread-forming shoes 50 for resiliently biasing the tread-forming shoes 50 in their outward, extended positions. Similarly, resilient springs 64 interconnect the member 36 and tread-forming shoes 56 in the outward extended positions thereof.

As shown in FIG. 3, each of the tread shoes 50 defines a recess 66 which may be generally aligned with an opening 68 in the member 44 upon movement of tread shoes 50 from their outward, extended positions toward the inward, retracted positions thereof. Upon such general alignment of the recess 66 and opening 68, an elongated shaft 70 in the form of a bolt may be positioned through each generally aligned opening 68 and 66, whereby the tread-forming shoes 50 are limited in movement under the urging of the springs 62 toward the outer, extended positions thereof, to positions between the outward, extended and inward, retracted positions thereof. The tread-forming shoes 56 and member 36 include a similar structure so selectively limiting the movement of the tread-forming shoes 56 under the urging of the resilient springs 64 toward the outward, extended positions thereof.

A body 72 for use with the structure as thus far described is shown in FIGS. 4-9. As shown therein, the body 72 is made up of a disc 73 (FIG. 5) having portions 75, 77 fixed to the opposite sides thereof. Two circular rings 79, 81 are resiliently mounted to opposite sides of the disc 73. The rings 79, 81 and outer portion of the disc 73 define a rib 76. The body 72 is thus made up of a generally annular main body portion 74, and a rib 76 positioned about the outer periphery of the generally annular main body portion 74. Fixed to the outer periphery of the rib are ears 78, positioned on opposite sides of the body 72. The utility of such ears 78 will be described in detail further on.

Figure 5:
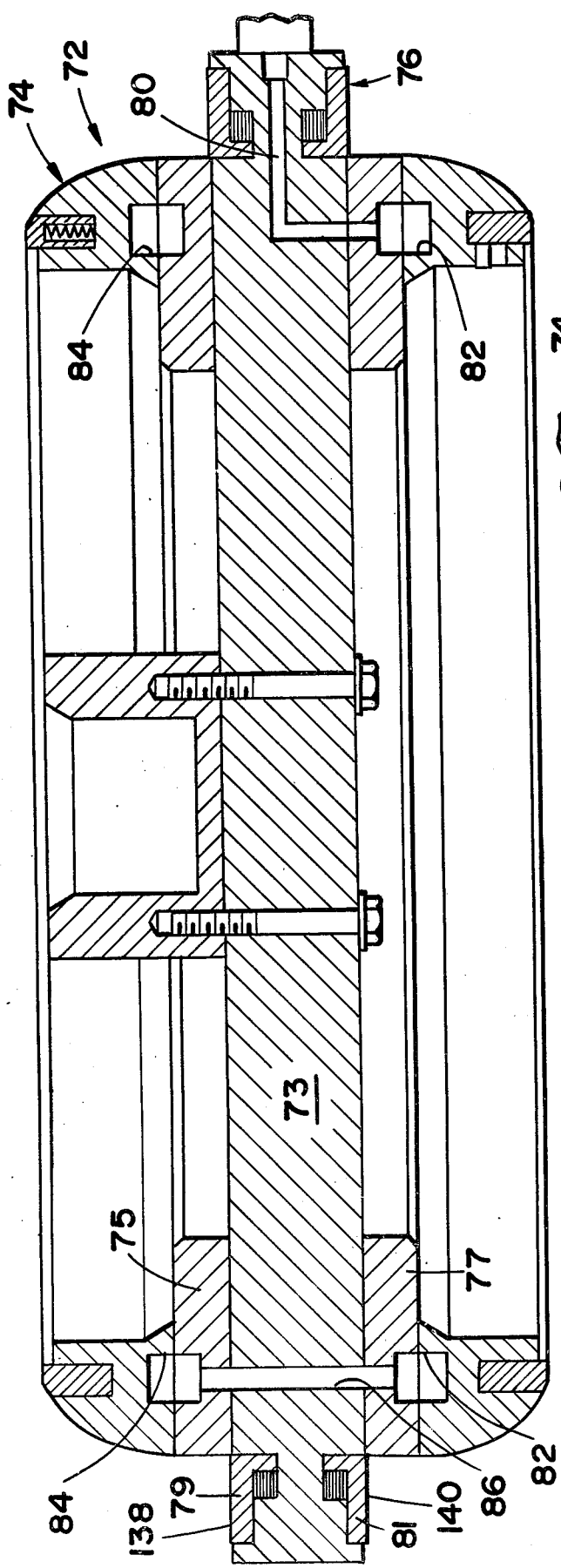
FIG. 5 is a sectional view taken along the line V—V of FIG. 4.
Figure 6:
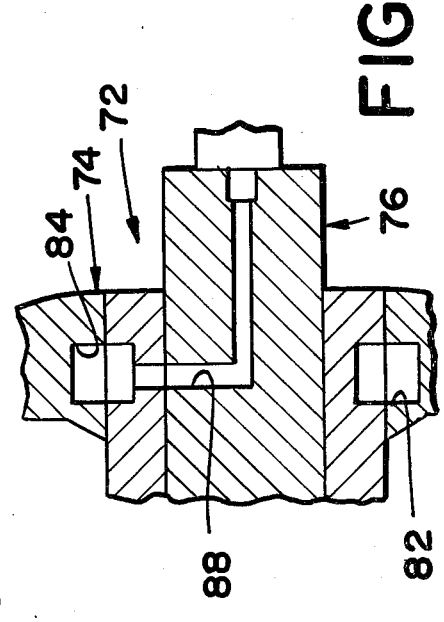
FIG. 6 is a sectional view taken along the line VI—VI of FIG. 4.

As best shown in FIG. 5, the body 72 defines a passage 80 extending from the outer periphery of the rib 76 to inside the body 72, communicating with an annular passage 82 defined within the body 72. Yet another annular passage 84 is defined by the body 72, and the two annular passages 82, 84 are connected by a cross passage 86. The annular passage 84, as shown in FIG. 6, communicates with yet another passage 88 extending to the outer periphery of the rib 76.

It will be seen that cooling liquid can be introduced into the passage 80, to circulate about the through annular passage 82, through cross passage 86, into annular passage 84, and from the annular passage 84 through the passage 88.

Figure 7:
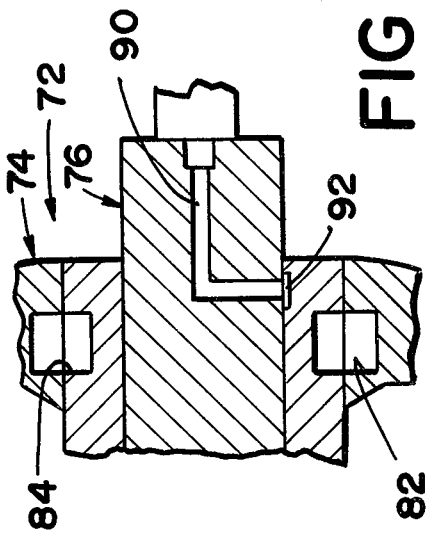
FIG. 7 is a sectional view taken along the line VII—VII of FIG. 4.
Figures 8, 9:
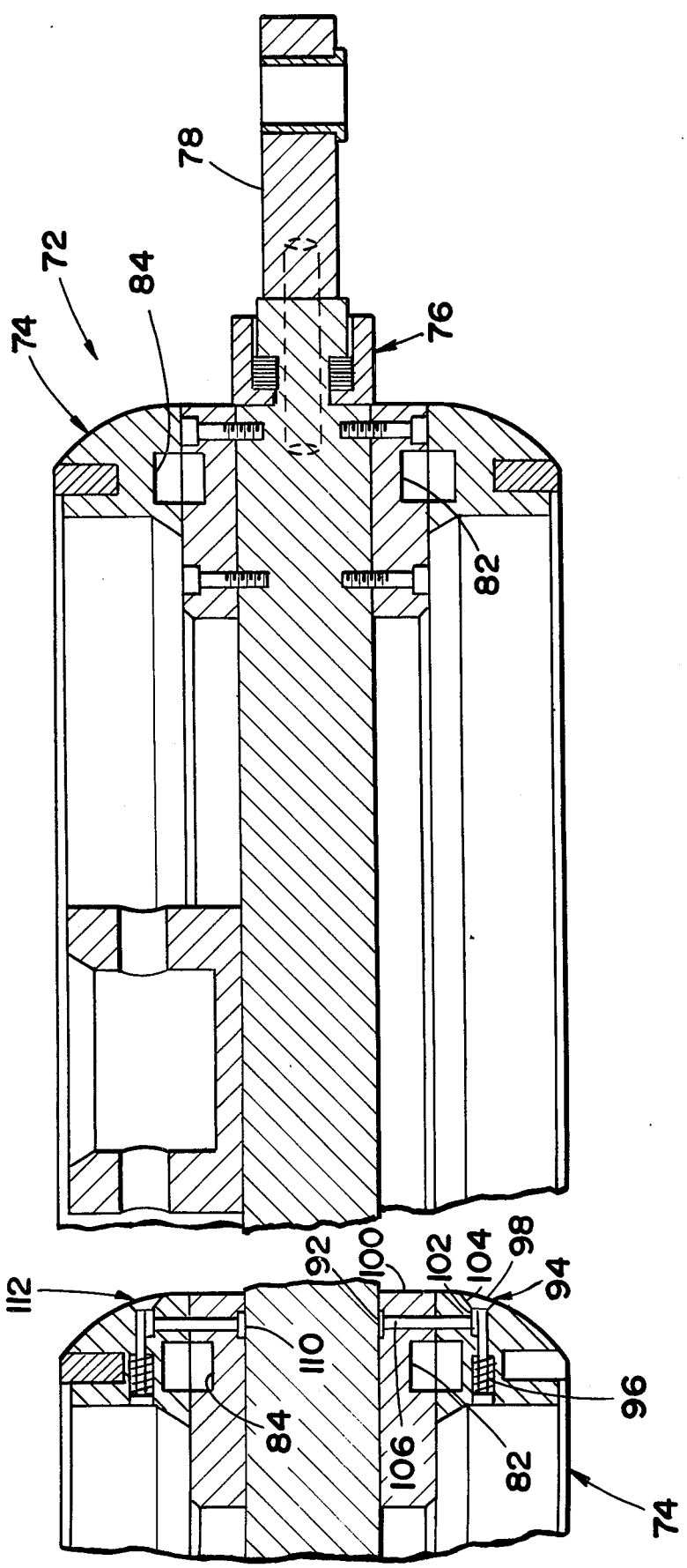
FIG. 8 is a sectional view taken along the line VIII—VIII of FIG. 4.
FIG. 9 is a sectional view taken along the line IX—IX of FIG. 4.

As best shown in FIGS. 7 and 9, yet another passage 90 extends from the outer periphery of the rib 76 to a third, smaller annular passage 92 defined by the body 72. The body 72 has movably mounted thereto a plurality of poppet valve members 94, each resiliently biased by a spring 96 into a position wherein the outer head surface 98 thereof is generally flush with the outer surface 100 of the main body portion 74, i.e., with the valve members 94 in their retracted positions. The valve members 94 are movable against the resilience of the springs 96 to extended positions wherein the outer head surfaces 98 thereof are extended from the surface 100 of the main body portion 74. Each of the poppet valve members 94 is movable in a chamber 102, a portion of which is defined by a portion of the inner head surface 104 of the poppet valve member 94, and each such chamber 102 communicates with the annular passage 92 through a passage 106. It will be seen that application of pressurized air to the passage 90 results in the fact that pressurized air is communicated to the annular passage 92, through the passages 106, and into the chambers 102 to move the valve members 94 to extended positions, wherein the outer head surfaces 98 thereof are extended from the surface 100 of the main body portion 74.

Yet another passage 108 (FIG. 4), similar to passage 80, but communicating with another internal annular passage 110 defined by the body 72, is used in a similar manner to actuate another plurality of poppet valve members 112 in the same manner.

Fixed to the lower surface 113 of the member 44 are the bodies 114 of a plurality of cylinders 116 (FIGS. 1 and 2), the rods 118 of which extend through flange portions 120, 122, defined by the member 44 and beyond the upper surface 124 thereof. Each rod 118 has secured thereto an elongated locking lug 126 which may be positioned, by turning of the rod 118 about the longitudinal axis thereof, through a respective elongated opening 128 defined by a flange 130 of the member 36. It will be seen that upon relative movement of the members 36, 44 together (FIGS. 1 and 2), the properly positioned locking lugs 126 are allowed to pass through the respective openings 128 in the flange 130. Then the individual locking lugs 126 may be turned to an extent so that upon the downward movement of the rods 118 of the cylinders 116, the locking lugs 126 contact portions of the upper surface 132 of the flange 130 to draw the members 36, 44 together with relatively great force. The cylinders 116 may of course be actuated in a well known manner, for example, being set up as slave cylinders responsive to actuation of a master cylinder (not shown).

In the use of the apparatus, the body 72 is lifted by means of a fork lift truck (not shown), the arms of the fork being in contact with the undersides of the ears 78 for proper transport thereof. The body 72 is moved to an oven and uncured rubber material is disposed in two strips 134, 136 about the body, the rubber being positioned on the main body portion 74 adjacent one and the other sides 140, 138 of the rib 76 (See FIG. 10). The fork lift truck then moves the body 72 with the rubber 134, 136 thereon to adjacent the upper and lower members 36, 44. The fork lift truck then deposits the body 72 onto the member 44. During this time, the tread-forming shoes 50, 56 are in their fully extended positions, and are being heated by application of heated fluid through passage means defined by the members 36, 44. The rib 76 is positioned so that one side 140 thereof is in contact with the tread-forming shoes 50 (See FIG. 10). The fork lift truck is then removed from the area of the members 36, 44. The member 36 is lowered relative to the member 44 by means of cylinder 26, so that the locking lugs 126 pass through the apertures 128. The locking lugs 126 are then rotated to be in position so that retraction of the rods 118 of the cylinders 116 will draw the member 36 to the member 44. During such downward movement of the member 36, the tread-forming shoes 56 have been brought into contact with the other side 138 of the rib 76.

The cylinders 116 are then actuated to move the member 36 toward the member 44 (FIG. 11), the cylinder 36 of course being extended sufficiently to allow enough slack in the chains 42 for such further drawing down of the member 36. Upon such further movement of the member 36, with the tread-forming shoes 50, 56 in contact with the opposite sides 140, 138 of the rib 76, it will be seen that further movement of the members 36, 44 together provides a relative movement of the tread-forming shoes 50, 56 and body 72 such that the tread-forming shoes 50, 56 move along the surfaces of the sides 140, 138 of the body 72 into contact with the rubber material 134, 136 on the body 72 with such relative movement being determined by the configurations of the sides 140, 138. Thereby, the tread-forming shoes 50, 56 are brought into contact with the rubber material 134, 136. That is, the movement of the tread-forming shoes 50, 56 and body 72 relatively takes place as if the body 72 were being held in a position, and the shoes 50, 56 were being slid along the sides 140, 138 of the rib 76, so that proper formation of the tread on the rubber material 134, 136 is provided.

During this process, cooling fluid is introduced into the passage 80 to flow through the annular passages 82, 84 and from the body 72 to provide a proper operating temperature of the body 72. Since the tread-forming shoes 50, 56 are in a heated state, the rubber material 34, 136 will tend to stick to such shoes rather than the cooled body 72.

With the members 36, 44 positioned as shown in FIG. 11, bolts 70 are inserted in the openings and recesses 68, 66 to limit movement of the tread-forming shoes 50, 56 under the urging of the springs 72, 74 toward the outer, extended positions thereof, to positions between the outward, extended and inward, retracted positions thereof. The member 36 is moved a small distance from the member 44, and the tread-forming shoes 50, 56 are moved toward their outward, extended positions, being limited by the bolts 70 as described above. The tread-forming shoes 50, 56 are thereby moved only a slight distance from the body 72, still in contact with the rubber material 134, 136. This increases the inner diameter of the rubber material 134, 136 adhering to the tread forming shoes 50, 56 for providing a slight clearance between the rubber material 134, 136 and the body 72 and subsequently between the rubber material 134, 136 and the rubber material 152 on the annular core 150. At this point, air is introduced into the passages 90, 108 to actuate the poppet valve members 94, 112, so that the outer head surfaces thereof extend beyond the outer surface 100 of the body portion 74, permitting air to force the rubber material 134, 136 from the body 72. It is thereby insured that the rubber material 134, 136 remains in contact with the tread-forming shoes 50, 56, and not in contact with the body 72.

Subsequently, the member 36 is removed further from the member 44 (FIG. 12), and the body 72 is removed from the members 36, 44.

FIG. 13 shows an annular core 150 having rubber material 152 already deposited thereon disposed on the member 44. Again, the member 36 is brought to adjacent the member 44 in this case, until the tread shoes 56 contact the tread shoes 50. At this point, it will be seen that further relative movement of the members 36, 44 together, through actuation of the cylinders 116 as above described, moves the rubber material 134, 136 in contact with the tread-forming shoes 50, 56 into contact with the rubber material 152 on the annular core 150 (See FIG. 14). The uncured rubber material 134, 136 in contact with the tread-forming shoes 50, 56 is brought into contact with the rubber material 152 positioned on the core 150 through movement of the tread-forming shoes 50, 56 toward the inward, retracted positions thereof. When the tread-forming shoes have reached the inward retracted position, the bolts 70 are removed and after curing the entire rubber material the member 36 is then removed from the member 44 as described above, allowing the tread-forming shoes 50, 56 to move under the resilience of the springs 62, 64 to their fully outward, extended positions as shown in FIG. 15, leaving a tire made up of rubber material having a tread formed thereon, disposed on a core 150.

A portion of an alternate embodiment of body 200 is shown in FIG. 16. As shown therein, the overall construction of the body 200 is generally similar to the body 72, with particular reference to FIG. 9. As shown in FIG. 16, the body 200 is made of a disc 202 having portions 204, 206 fixed to opposite sides thereof. This generally makes up an annular main body portion 208, and movable body members 210, 212 in the form of rings are movably mounted to the main body portion 208, making up with a portion of the disc 202 a rib 209. Resilient elastomeric members 214, 216 are interposed the rings 210, 212 and disc 202, so that the rings 210, 212 are resiliently urged away from the opposite sides of the disc 202. The inner peripheries 218, 220 of the respective rings 210, 212 are quite adjacent the outer surface 221, 223 of the main body portion 208.

The ring 210 defines a plurality of passages therethrough (one shown at 222) and likewise the ring 212 defines a plurality of passages therethrough (one shown at 224). These passages lead from adjacent an annular depression 226 defined by the body portion 208 and another annular depression 228 defined by the body portion 208.

Additional rings 232, 234 are movably mounted to opposite sides of the body 200, resiliently bound by spring means 236 to their outward positions, similar to the previous embodiment of FIG. 5.

In the use of such apparatus, the tread-forming shoes as previously described bear on the rings 210, 212, compressing the elastomeric members 214, 216 under the force of such shoes, with the body in the general position shown in, for example, FIG. 11. In such state, as the tread-forming shoes form tread on elastomeric material on the surface 221 of the body 200 and the surface 223 of the body 200, excess elastomeric material will be caused to flow under the force of the shoes into the annular depressions 226, through the passages 222 in the ring 210 and generally from the apparatus. Likewise, elastomeric material will flow into the annular depression 228 and through the passage 224 in the ring 212 and generally from the apparatus. The rings 232, 234, being in contact with the shoes, act as dams to retain elastomeric material in the proper areas. Thus, it will be seen that flow of elastomeric material during the tread-forming operation is allowed for in the embodiment shown in FIG. 16, so that it is insured that any material forced from the tread-forming areas is allowed to flow relatively free therefrom.

In the event that too much elastomeric material has initially been applied to the body 200, the resilience of the spring means 236 will be overcome, allowing excess elastomeric material to flow past the edge of the rings 232, 234.

After insertion of the bolts 70, and upon the lifting of the member 36 from the member 44 (similar to that shown in FIG. 12), the force compressing the elastomeric members 214, 216 is removed from the rings 210, 212, allowing the rings 210, 212 to move to positions wherein communication is no longer provided between the area 230 of the body 200 and the annular depression 226, or the area 231 of the body 200 and the annular depression 228. As the rings 210, 212 move under the resilience of the elastomeric members 214, 216, the edges of the rings 210, 212 at the inner peripheries 218, 220 thereof adjacent the main body portion 208 act as cutting members to cut off the elastomeric material which has flowed from the tread-forming areas 230, 231, into the annular depressions 226, 228 leaving elastomeric material on the body 200 of proper shape and size sith proper tread formed thereon. This cutting operation is insured during such removal of the member 36 from the member 44 since the elastomeric members 214, 216 resiliently bias the rings 210, 212 toward positions blocking flow of elastomeric material from the areas 230, 231, through the passages 222, 224.

As yet another alternative, elastomeric material need not be initially applied to a body adjacent one and the other sides thereof in accordance with FIGS. 10–11. Rather, as shown in FIG. 17, the body 300 may be provided with a plurality of upper passages 302, and a plurality of lower passages 304, all communicating with a main conduit 306 in turn communicating with the head end 308 of a cylinder 310. In such system, the first and second members 36, 44 are brought together prior to the introduction of any elastomeric material on which tread is to be formed (FIG. 18), and then the cylinder 310 is actuated so that elastomeric material 312 is injected through the conduit 306, through the passages 302, 304 in the body 300, and onto the body 300, and into the cavity defined by the surfaces of the body 300 and the surfaces of the tread-forming shoes 50, 56, meanwhile with such elastomeric material having tread formed thereon during such operation. The member 36 may be subsequently removed from the member 44 after insertion of the bolts 70, as shown in FIG. 19, whereupon elastomeric material 314, 316 remains on the shoes 56, and on the shoes 50, in accordance with the previous embodiment. Subsequent steps in this method are identical to those shown in FIGS. 13–15.

As yet another embodiment, the member 36' is provided with passages 350, 352 which communicate with conduits 354, 356 which in turn communicate with a main conduit 358, communicating with the head end 360 of a cylinder 362. Likewise, the member 44' is provided with passages 364, 366 which communicate with conduits 368, 370 which in turn communicate with a conduit 372 in turn communicating with the head end 374 of another cylinder 376. The cylinders 362, 376 are filled with elastomeric material 378 which is made to flow into the appropriate tread-forming areas, through the member 36' and member 44' with the members 36', 44' already brought together, and without the body 72, having had previously applied thereto any elastomeric material.

In yet another method, it will be understood that a portion of the elastomeric material can be initially applied to the body 72, and the remaining necessary elastomeric material may be applied through the method in accordance with FIGS. 17–19 or the method in accordance with FIG. 20.

While both embodiments described include a center-parting mold apparatus, it is to be understood that the parting line of the mold portions need not be substantially at the center of the overall apparatus, but can be spaced therefrom, i.e., the mold apparatus could be of the edge-parting or shoulder-parting type.

The embodiments of the invention in which an exclusive property or privilege is claimed are defined as follows:

1. In a method of forming a tread on a green tire carcass in which uncured elastomer is first deposited onto a peripheral surface of an annular body, then transferred to a pair of members by first moving the members into contact with the uncured elastomer on the annular body and then separating the members with the uncured elastomer adhering thereto from the annular body, and subsequently applied to a tread area of green tire carcass by moving the members to a position at which the uncured elastomer adhering thereto contacts the green tire carcass positioned between the members, the improvement comprising:

said step of transferring the uncured elastomer to the members includes the steps of moving a plurality of tread forming shoes mounted on the members from an outward extended position radially inwardly to an inward retracted position forming a tread on the uncured elastomer, and then moving the shoes radially outwardly to an intermediate position between said inward retracted and outward extended position and providing a slight clearance between the uncured elastomer adhering to the tread forming shoes and said body and said green tire carcass.

2. The method of claim 1 wherein said step of moving the shoes to said intermediate position includes the steps of resiliently urging the shoes from the inward retracted position toward the outward extended position and selectively limiting movement of said shoes to said intermediate position.

3. The method of claim 1 including the step of decreasing the adhesion between the uncured elastomer and the annular body subsequent to the step of moving the shoes into contact with the uncured elastomer.

4. The method of claim 3 wherein said step of decreasing the adhesion includes the step of supplying cooling liquid to the annular body.

5. The method of claim 1 including the step of forcing the uncured elastomer from the annular body subsequent to the step of moving the shoes into contact with the uncured elastomer.

6. The method of claim 5 wherein said step of forcing the uncured elastomer from the body includes the step of applying pressurized fluid between the uncured elastomer and the annular body.

7. In a method of forming a tread on a green tire carcass in which uncured elastomer is first injected into a pair of annular cavities individually formed between an annular body and a pair of members for forming a tread pattern in the band of uncured elastomer in the cavities, then retained on the members upon moving the members away from the annular body, and subsequently applied to a tread area of a green tire carcass by moving the members to a position at which the uncured elastomer retained on the annular body is applied to the green tire carcass positioned between the members, the improvement comprising:

said step of retaining the uncured elastomer on the members includes the steps of moving a plurality of shoes mounted on the members to an intermediate position between an inner retracted position and an outward extended position and providing a slight clearance between the band of uncured elastomer adhering to the shoes and said body and said green tire carcass.

8. The method of claim 7 wherein the step of moving the shoes to said intermediate position includes resiliently urging the shoes from the inward retracted position toward said outward extended position and selectively limiting movement of said shoes to said intermediate position.

9. A method of forming a tread on a green tire carcass comprising the steps of:

depositing uncured elastomer to a peripheral surface of an annular body;

positioning the annular body between a pair of members each of which has a plurality of shoes movably mounted thereon;

forming a tread pattern on the uncured elastomer on the annular body by moving said shoes radially inwardly from an outward extended position to an inward retracted position at which the shoes contact the uncured elastomer on the annular body;

moving the shoes radially outwardly to an intermediate position between said inward retracted position and said outward extended position and providing a slight clearance between the uncured elastomer adhering to the shoes and the body;

removing the annular body from between the members;

positioning a green tire carcass between the members; and moving the shoes radially inwardly to said inward retracted position at which the uncured elastomer on the shoes is applied to the tread area of the green tire carcass.

10. The method of claim 9 wherein said step of moving the shoes to said intermediate position includes resiliently urging the shoes from the inward retracted position toward said outward extended position, and selectively limiting movement of said shoes at said intermediate position.

11. The method of claim 9 including the step of decreasing the adhesion between the uncured elastomer and the annular body subsequent to the step of moving the shoes into contact with the uncured elastomer.

12. The method of claim 11 including the step of supplying cooling liquid to the annular body.

13. The method of claim 10 including the step of forcing the uncured elastomer from the body subsequent to the step of moving the shoes into contact with the uncured elastomer.

14. The method of claim 13 wherein said step of forcing the elastomer from the annular body includes applying pressurized fluid between the uncured elastomer and the annular body.

* * * * *